July 22, 1952 R. H. HALVORSEN 2,604,538
RECORD CARD CONTROLLED CODE CONVERTER
Filed Feb. 3, 1950 8 Sheets-Sheet 2

INVENTOR
RALPH H. HALVORSEN
BY Emery Robinson
ATTORNEY

July 22, 1952 R. H. HALVORSEN 2,604,538
RECORD CARD CONTROLLED CODE CONVERTER
Filed Feb. 3, 1950 8 Sheets-Sheet 3

INVENTOR
RALPH H. HALVORSEN
ATTORNEY

July 22, 1952 R. H. HALVORSEN 2,604,538
RECORD CARD CONTROLLED CODE CONVERTER
Filed Feb. 3, 1950 8 Sheets-Sheet 4

INVENTOR
RALPH H. HALVORSEN
BY Emery Robinson
ATTORNEY

July 22, 1952  R. H. HALVORSEN  2,604,538
RECORD CARD CONTROLLED CODE CONVERTER
Filed Feb. 3, 1950  8 Sheets-Sheet 5
FIG. 5
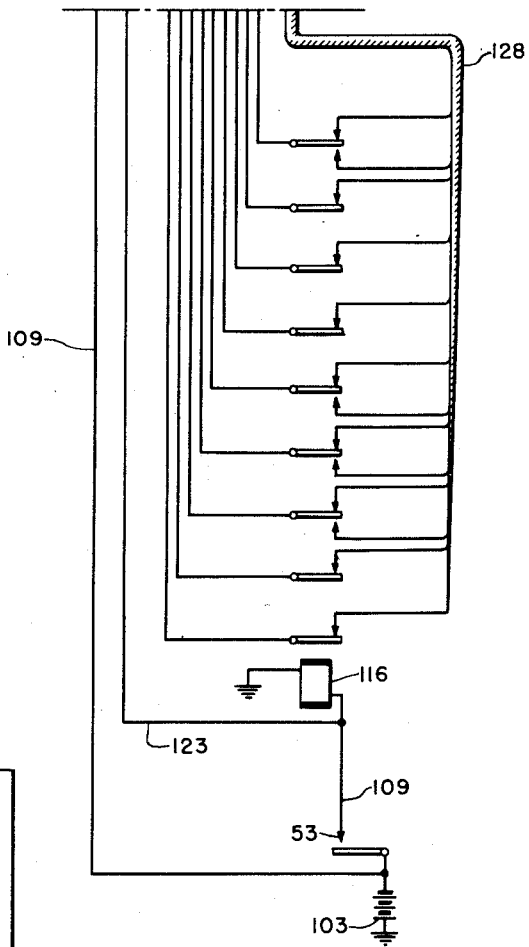
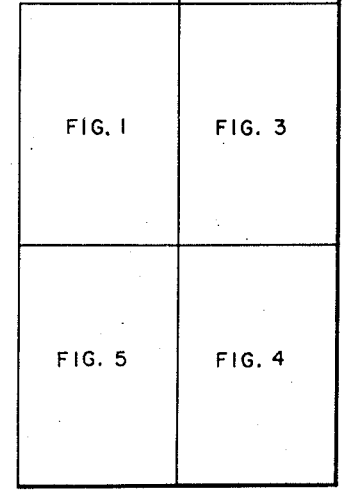
INVENTOR
RALPH H. HALVORSEN
BY Emery Robinson
ATTORNEY INVENTOR
RALPH H. HALVORSEN
BY Emery Robinson
ATTORNEY July 22, 1952     R. H. HALVORSEN     2,604,538
RECORD CARD CONTROLLED CODE CONVERTER
Filed Feb. 3, 1950                8 Sheets-Sheet 7
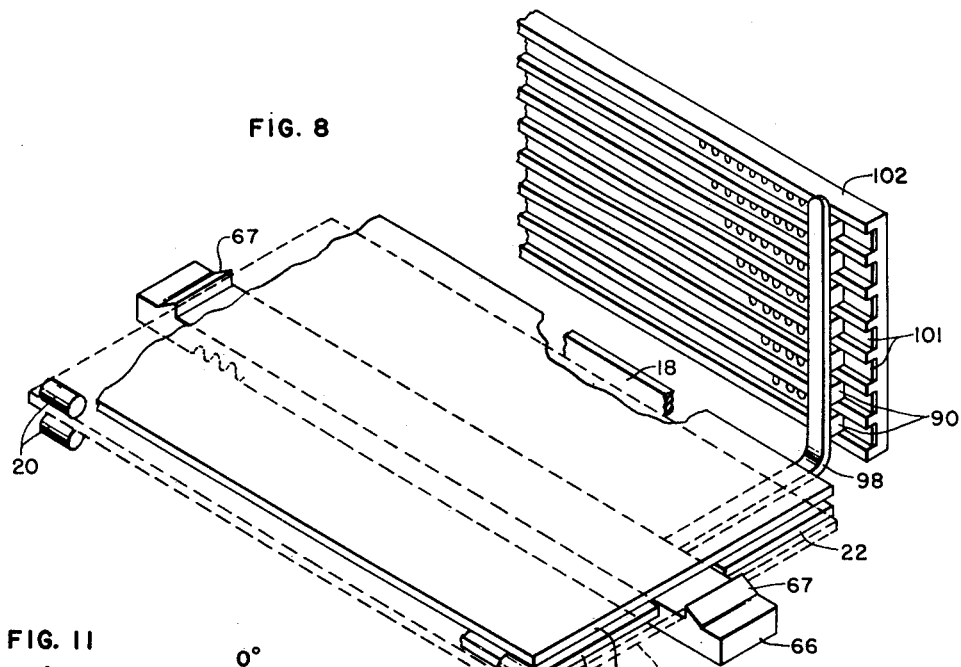
FIG. 8
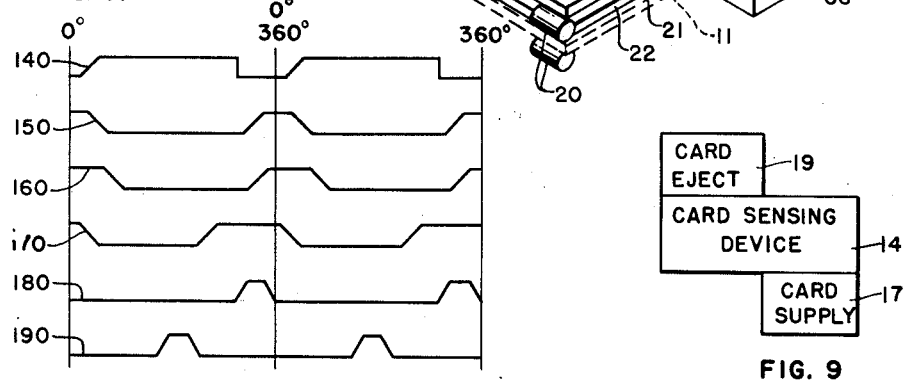
FIG. 11
FIG. 9
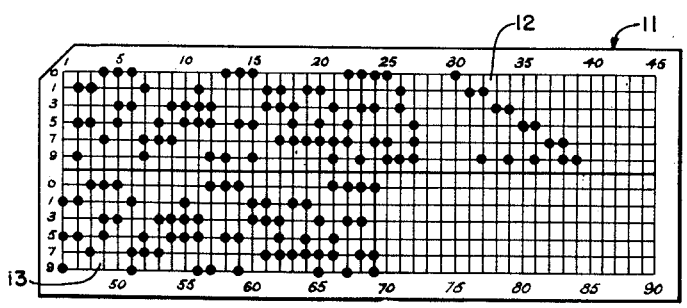
FIG. 10
INVENTOR
RALPH H. HALVORSEN
BY Emery Robinson
ATTORNEY

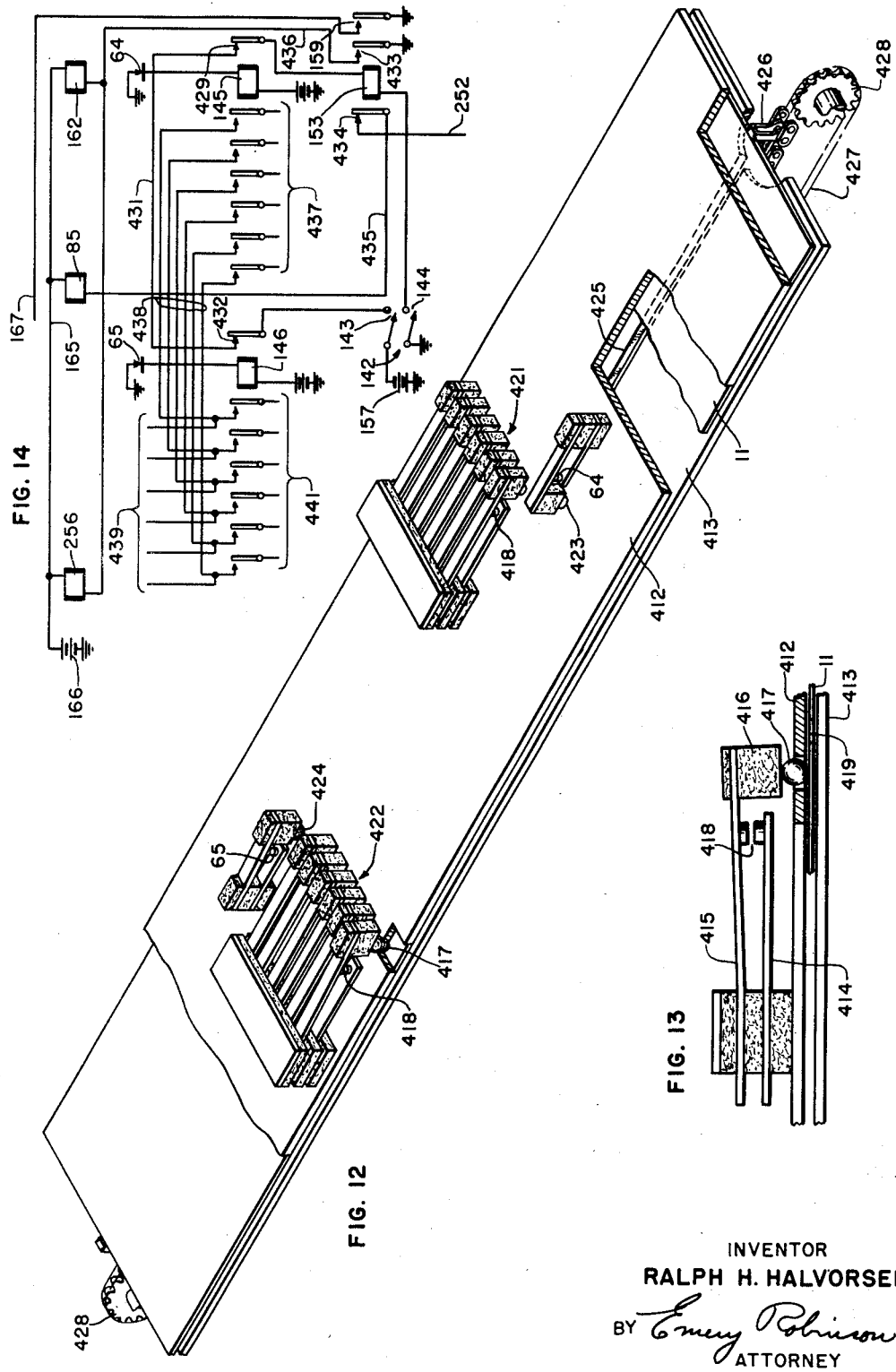

Patented July 22, 1952

2,604,538

UNITED STATES PATENT OFFICE 2,604,538

RECORD CARD CONTROLLED CODE CONVERTER

Ralph H. Halvorsen, Chicago, Ill., assignor to Teletype Corporation, Chicago, Ill., a corporation of Delaware Application February 3, 1950, Serial No. 142,262

8 Claims. (Cl. 178—26)

This invention pertains to a code conversion arrangement for converting information in perforated form from one code to a different code.

The principal object of the invention is to provide code translating instrumentalities for translating data stored in statistical or tabulating cards in one code into information stored in a control record in a different code.

Another object of the invention is to provide means for sequentially sensing the upper and lower fields of a statistical or tabulating card and then transmitting the information sensed to a reperforator to produce a perforated tape record.

Another object of the invention is to translate codes normally used in the production of business machine cards to codes such as the Baudot code for use in telegraph transmission.

Specifically, the invention contemplates a code conversion arrangement comprising a card sensing device associated with the punched card type of tabulating machinery which is adapted to translate a pre-punched card and through electrical circuits cause a tape to be perforated. An important feature resides in the manner of directing the card through the card sensing device to facilitate sensing first one field (for example, the upper field) and then the other field (that is, the lower field). The conversion from card code to telegraph (Baudot) code is achieved through a fan circuit which includes a group of card code relays for the purpose of preparing operating paths to a group of Baudot code relays which, in turn, sets up the transmitting code to a distributor or to a five magnet tape punch. Another feature of the invention resides in providing a case shift means for automatically inserting "letters" and "figures" (unshift and shift, respectively) codes in the tape, depending on the character code sensed in the tabulating card.

The above and other objects and features of the present invention will be fully set forth in the following description and appended claims, and will be more readily understood by reference to the accompanying drawings, wherein Figs. 1 to 5, inclusive, are component parts of an electrical circuit arrangement associated with the card sensing device according to the present invention;

Fig. 6 is a view showing the relative arrangement of Figs. 1 to 5, inclusive;

Fig. 8 is a perspective view showing a commutator associated with the card rack for automatically inserting telegraph signals;

Fig. 9 is a schematic plan view of the arrangement according to the present invention;

Fig. 10 is a plan view of the form of card for use in connection with the present invention;

Fig. 11 is a cam diagram of the cams in the distributor unit;

Fig. 12 is a perspective view of an alternate form of card sensing unit;

Fig. 13 is a cross sectional view of a card sensing element; and

Fig. 14 is a modified portion of the electrical circuit according to the invention.

Figure 1:
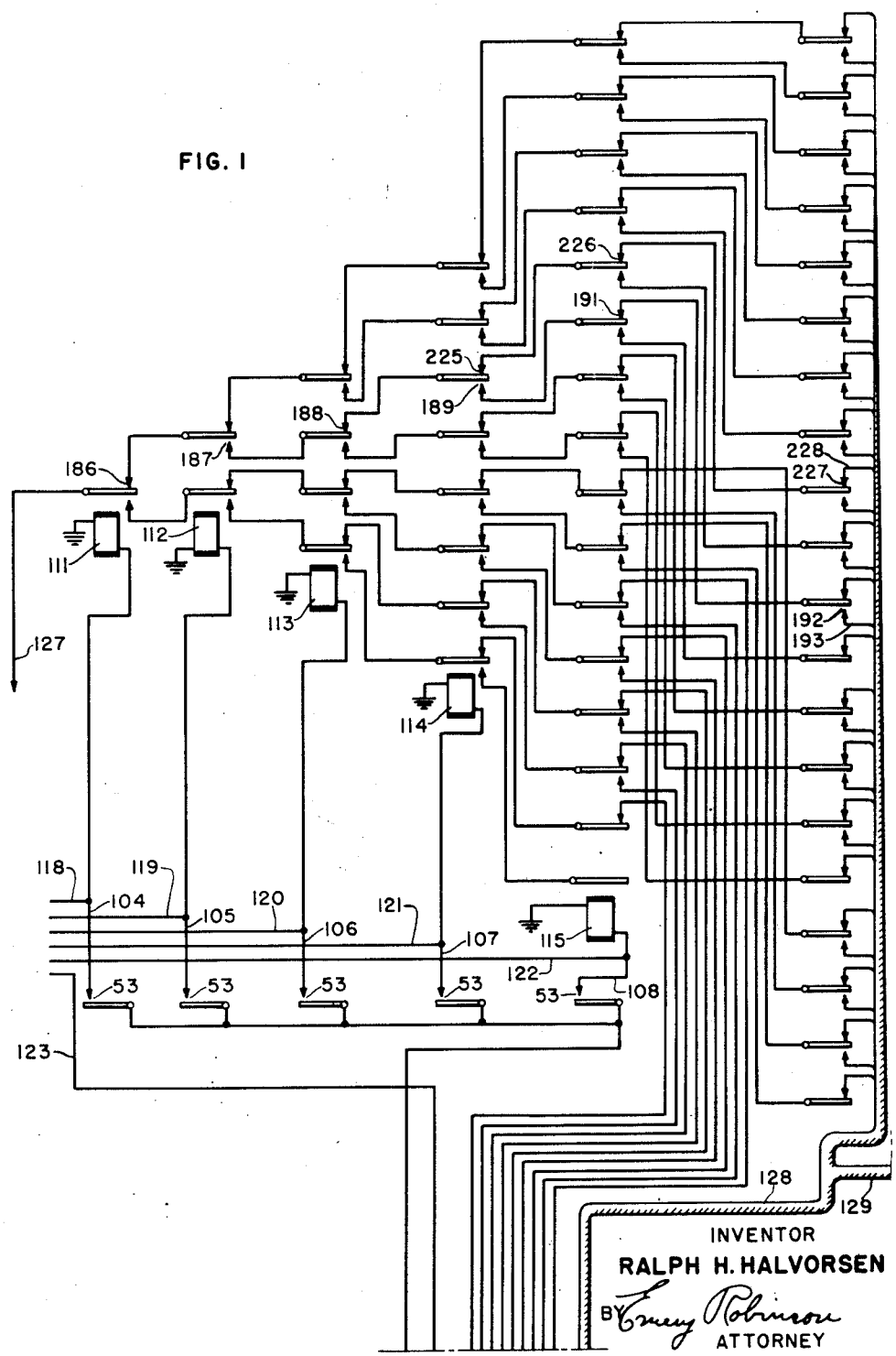

Having reference to the drawings wherein like reference characters represent like parts throughout the several views, the card sensing device shown in Fig. 1 is arranged to read or sense statistical cards such as shown in Fig. 10. The record or statistical card 11 comprises 45 columns and is divided into an upper field 12 and a lower field 13, thus providing 90 columns of information, 45 columns in each field. Cards 11 are fed into a card sensing device, illustrated in Fig. 7 and indicated generally by the numeric 14, which includes sensing mechanisms 15 and 16 for sequentially sensing said upper and lower fields 12 and 13, respectively. As indicated in Fig. 9, a stack of cards is placed in a card supply receptacle 17 and card feeding facilities, exemplified by revolving feed rolls 20, are provided such as disclosed in Fig. 2 of U. S. Patent No. 2,044,707. Upon being fed into the card sensing device 14, the card 11 is held against a stop 18, analogous to stop 34 shown in Fig. 2 of said patent. The card 11 is then fed step-by-step, or column by column, by feeding mechanism hereinafter described, toward the left as viewed in Fig. 9, whereupon the card 11 is eventually ejected into a receiving magazine (or card eject) 19 in the manner also shown in Fig. 2 of Patent No. 2,044,707 and therein described.

The card 11 is thus inserted between the upper plate 21 and lower plate 22—22 of the card sensing device 14 and is bearing against the stop 18. In the portion of the card sensing device 14 embraced by the card 11 in this initial position, is the card sensing means 15 for sensing or reading the perforated code record in the upper field 12 of the card 11. The card sensing means 15 comprises in the present embodiment a series of six sensing fingers 23 guided for vertical reciprocation by suitable guiding means (not shown). Adjacent the upper end of each sensing finger 10 is a leftwardly directed notch 24 (as viewed in Fig. 7). The several notches 24 are arranged in alignment to receive the ball portion 25 of a sensing bail 26 mounted pivotally on an appropriately located pivot shaft 27. The opposite arm of bail 26 terminates in a cam follower portion 28. A spring 29 normally biases bail 26 counterclockwise causing follower portion 27 to engage the periphery of a sensing control cam 31 carried integrally on a cam sleeve 32 which is driven by a power shaft 33 through a friction clutch 34 of well known construction. Also integral with the sleeve 32 is a stop disc 35 which cooperates with the armature 36 of an upper field sensing magnet 37.

Contiguous to the friction clutch 34, in the present embodiment, and also carried on the drive shaft 33 is a cam sleeve 38 provided integrally thereon with a stop disc 39 and a lower field sensing control cam 41. Cooperating with stop disc 39 is an armature 42 of a lower field sensing magnet 43. Armatures 36 and 42 are mounted pivotally on an appropriately journaled pivot shaft 44.

Similar to card sensing means 15, the card sensing means 16 comprises a series of six sensing fingers 45 appropriately guided to sense the code perforations in the lower field of the card 11. The fingers 45 are provided adjacent their upper extremities with a series of aligned notches 46 adapted to receive the bail portion 47 of a sensing bail 48 mounted pivotally on a shaft 49. A spring 51 normally biases the bail 48 clockwise to bring the follower portion 52 thereof into engagement with the periphery of the sensing cam 41.

The upper extremities of sensing fingers 23 control the opening and closing of individual contacts 53. Similarly, the upper ends of fingers 45 cooperate with individual contacts 54. Besides the slots 55 and 56 in upper plate 21 for sensing pins 23 and 45 respectively, apertures 57 and 58 are also provided therein for upper and lower field contact devices 59 and 61, respectively. Contact device 59 comprises a lever 62 mounted pivotally on a shaft 63. One arm of lever 62 is provided with means operable through aperture 57 to coact with the card 11, while the other arm of lever 62 coacts with a contact 64. With a card in the card sensing device 14 adjacent sensing fingers 23, the card contact 64, for the upper field will open, the effect of which will appear hereinafter. The contact 64 will remain open until the card 11 has progressed stepwise the 45 columns of the upper field. The upper and lower field card contacts 64 and 65, respectively, are so located that as the card 11 moves from the forty-fifth to the forty-sixth column, the lower field contacts 65 will open and the upper field card contacts 64 will close, the effect of which will also appear hereinafter. The system according to the present invention will function thus until all 90 card columns are sensed.

The mechanism for moving the card 11 stepwise for column by column sensing comprises a stepping rack member 66 disposed immediately below the card sensing device, and operable between bottom plates 22 and 22'. Rack 66 is provided with a pair of projections 67 between which the card 11 is guided to the stop 18 (Fig. 8). Projections 67 also function to retain the card 11 to effect stepwise or columnwise movement of said card during the sensing operation. The bottom side of rack member 66 is provided with rack teeth 68 which cooperates with a stepping gear 69 which, in turn, is connected, through a tongue and groove connection 71 to a driven clutch portion 72 of a toothed clutch comprising also a driving portion 73 fixed to a shaft 74. A compression spring 75 functions to hold clutch portions 72 and 73 into engagement. A gear 76 is also fixed to the shaft 74 and is meshed with a pinion gear 77 fixed to a drive shaft 78 in a manner as to impart counterclockwise rotation to the gear 76, and hence to the shaft 74. A power shaft 79 normally tends to drive the shaft 78 through a friction clutch 81.

Fixed to the shaft 78 is a stepping ratchet 82 which cooperates with an escapement member 83 mounted pivotally on a pivot shaft 84. Escapement member 83 is controlled by a stepping magnet 85 which is periodically energized in a manner to be hereinafter described. Integral with clutch portion 72 are a pair of flanges 86 and 87 spaced to provide a groove for a forked member 88 mounted pivotally on a pivot shaft 89 and adapted to be controlled by a carriage return magnet 267. When the magnet 91 is energized, as will hereinafter appear, the clutch portion 72 will become disengaged from the clutch portion 73, thereby permitting the carriage return spring (not shown, but of the form disclosed in U. S. Patent 1,904,164) to function through its strap 92 to draw the rack bar 66 rightwardly, as viewed in Fig. 7 until its returns to the position whereat a new card can be fed into the sensing device 14. The rack bar 66 in its rightward or returned position cooperates with a contact arm 93 to operate a pair of card feed contacts 94 and 95, as will presently appear. In its leftward position, the rack bar 66 cooperates with a contact arm 96 to operate a pair of card eject contacts 259 and 272 as will also appear presently.

As shown in Fig. 8, the rack bar 66 is provided with an arm 98 extending rearwardly and upwardly which carries a plurality of commutator brushes 90 adapted to cooperate with a corresponding number of commutator segments 101 embedded in a commutator rack 102 of suitable insulating material. The commutator 102 extends the entire length of the stepping rack 66 to embrace the entire 90 columns. Each segment 101 represents a function such as, line feed, trip, carriage return and skip for which it is desired to perforate a telegraph signal code combination in a tape. The commutator brush 98 containing seven contact brushes 90 so mounted as to coincide with the commutator segments 101 in the commutator rack 102 is attached to and moves with the stepping rack 66. The segments 101 in the commutator rack 102 are drilled at each step or column so that a copper peg may be inserted at any location on the commutator rack. It will be assumed that a peg is inserted in column 45 of the trip commutator segment (one of the segments 101). Then, as the commutator brush 90 reaches the peg in the trip commutator bar, a circuit will be closed to operate the trip relay, as will hereinafter appear in the description of the electrical circuit.

As previously mentioned, the code conversion from card code to Baudot (or other) code is achieved through a fan circuit to a group of Baudot code relays, which set up the Baudot code to be transmitted. In the upper field, the sensing fingers 23 close one or more contacts 53 (Figs. 1, 5 and 7) according to the particular character sensed, whereupon circuits will be established from grounded battery 103 (Figs. 5 and 7), through one or more closed contacts 53 (which are connected in parallel), over their respective conductors 104 to 109, and through their respective relays 111 to 116 to ground. Similarly, in the lower field, the sensing fingers 45 close one or more contacts 54 according to the particular character sensed, whereupon circuits will be established from grounded battery 117 (Fig. 7), through one or more closed contacts 54 (which are also connected in parallel), over their respective conductors 118 to 123 and then through their respective relays 111 to 116 to ground.

Relays 111 to 116 when energized in accordance with the setting of the fingers 23 or 45 (depending on whether the upper or lower field is being sensed or read) will establish a path through the fan circuit (Fig. 1) extending from grounded battery 124 (Fig. 4), through cam controlled contact 125 (controlled by the cam exemplified by cam contour 160, Fig. 11) in the distributor 126, over conductor 127 (Figs. 1 and 4), thence through the operated contacts of relay 111 to 116, through the cables 128, 129 and 130, through the windings of the respective Baudot code relays 131, then either over conductor 132 and through "Letters" relay 133 (Fig. 2) to ground, or over conductor 134 and through "Figures" relay 135 to ground. Relays 133 and 135 became locked up over conductor 136 (Figs. 2, 3 and 4) and through contact 137 (controlled by cam 140, Fig. 11) in distributor 126 (Fig. 4) to grounded battery 138. As will appear hereinafter, the Baudot code signal set upon the contacts associated with the operated relay 131 will be transmitted through the transmitting contacts 139 embodied in the distributor 126 (Fig. 4). The Baudot code signal thus generated may be employed to operate a tape perforator replacing the transmitter 139.

The "letters" relay 133 and "figures" relay 135, together with "letters" conditioning relay 141 and "figures" conditioning relay 142 are utilized for the purpose of automatically inserting letters and figures case code signals in the tape upon each change of case depending on the code sensed in the tabulating card. Assuming that a stack of cards is placed in the card magazine 17, the start switch 142 is operated to close contacts 143 and 144 thereof. When no cards are as yet in the card sensing device 14, the contacts 64 and 65 are closed and accordingly, the upper field relay 145 and the lower field relay 146 are in an energized condition. Relay 145 is operated over a circuit extending from battery 147, over conductor 148, through winding of relay 145, through contact 64 to ground. Relay 146 is operated from battery 147, over conductors 149 and 151, through the winding of relay 146, through contact 65 to battery.

With the operation of the start switch 142, the contacts 143 and 144 will be closed, and an energizing circuit for start relay 153 will be established from ground, through contact 144 (now closed), through the winding of start relay 153, through contact 154 (now closed) of upper field relay 145, through contact 155 (now closed) of relay 146, over conductor 156 and through contact 143 to grounded battery 157. Relay 153 upon operating will close its contacts 158 and 159, and will open its contact 161. Contact 158 upon closing completes a circuit for the energization of the card feed magnet 162 (Fig. 2) extending from ground, through contact 158 (now closed), over conductor 163, through contact 95 (which is closed only when the stepping rack member is in its rightward or starting position), over conductor 164, through the winding of the card feed magnet 162 and over bus conductor 165 to grounded battery 166. The operation of the card feed magnet 162 will advance a card into the card sensing device 14 in the manner disclosed in aforementioned Patent 2,044,707. With a card 11 in the card sensing device 14, the card controlled contact 64 for the upper field 12 will open, thereby de-energizing the upper field relay 145.

Contact 159 (of start relay 153) upon closing will complete a circuit for energizing a "Figures" conditioning relay 142 extending from ground, through contact 159, over conductor 167, through the winding of relay 142, to grounded battery 168. Relay 142 will become locked up over a circuit extending from grounded battery 168, through the winding of relay 142, through contact 169 (now closed), over conductor 171 and through contact 172 (now closed) of "Letters" relay 133 to ground.

Upon the deenergization of the upper field relay 145 due to the opening of contact 64 by a card 11, its contact 154 will open, thus breaking the circuit for the start relay 153. Also, the opening of contact 158 of start relay 153 will break the previously described circuit for the card feeding magnet 162. The release of the upper field relay 145 and the start relay 153 will cause the upper field sensing magnet 37 (Figs. 2 and 7) to become energized over a circuit extending from grounded battery 166, over conductor 165, through the winding of upper field sensing magnet 37, over conductor 173, through contact 174 (now closed) of upper field relay 145 through contact 175 (still closed) of lower field relay 146, over conductor 176, through contact 161 (now closed) of start relay 153, over conductor 177, through contact 178 (now closed) of relay 142, then over conductor 179 (Figs. 2, 3, and 4), through contact 181 (now closed) of relay 182, over conductor 183, through cam controlled contact 184 (controlled by cam 170, Fig. 11) in the distributor 126, and through tape controlled contact 185 to ground. Thus, the upper field sensing magnet 37 (Fig. 1) becomes energized, thereby pulling up its armature 36 to release the sleeve 32 for rotation. Cam 31 thus acts to oscillate the bail member 26 to reciprocate the tape sensing pins or fingers 23. The energizing circuit for the upper field sensing magnet 37 is extended through the taut tape contact 185 on a reperforator (not shown) so that the sensing operation will not start if tape is not available in the reperforator. Of course, a reperforator may or may not be associated with the distributor 126.

The bail 25 in its downward movement allows the sensing fingers 23 to read the code perforated in the card 11. The fingers 23, depending on the code punched in the card being sensed, will cause the card code contacts 53 to close, and the closure of these contacts 53 will cause the card code relays 111 to 116 to energize in accordance with the code sensed in the card 11. Assuming that the code for the character A (in card code) is sensed in the card, sensing fingers 23 in the 1, 5 and 9 positions (Fig. 10) will protrude far enough downward to allow the code sensing contacts 53 to close, since perforations are punched in the card at these locations. With the 1, 5 and 9 sensing contacts 53 closed the 1, 5 and 9 card code relays 112, 114 and 116, respectively will operate.

With the operation of the card-code relays 112, 114 and 115 (1, 5 and 9 positions) a circuit will be closed from battery 124 (Fig. 4), through contact 125 (now closed), over conductor 127 (Figs. 4 and 1), through contact 186 of the unoperated "zero" card-code relay 111, then through contact 187 (now closed) of the operated "No. 1" relay 112, through contact 188 of the unoperated "No. 3" relay 113, through contact 189 (now closed) of the operated "No. 5" relay 114, through contact 191 of the operated "No. 7" relay 115, and through contact 192 (now closed) of the operated "No. 9" relay 116. This relay 116 is shown in Fig. 5 but embraces also the vertical row of contacts shown in both Figs. 5 and 1 of which contact 192 is a part. The circuit then extends over conductor 193 (which passes through cables 128, 129 and 130 (Figs. 1 and 3), through the winding of the "A" code relay 194 (Fig. 3) of the group of relays 131, then over conductor 132, and through the winding of "Letters" code relay 133 (Fig. 2) to ground. Although a code relay 131 (such as relay 194) is connected in series with the relays 133 (or 135), the characteristics of the relay winding are such that only the relay 133 or 135 will energize, because it will require a stronger current to energize a code relay 131. This is achieved in a manner which will presently appear.

Relay 133, in operating, closes its contacts 195, 196, 197 and code contacts 198, and opens its contacts 172 and 199. The opening of contact 172 breaks the locking circuit for relay 142. Contact 197 in closing completes an energizing circuit for the distributor clutch magnet 201 (Fig. 4) extending from ground, through cam operated contact 202 (now closed), through the winding of magnet 201, over conductor 203 (Figs. 2, 3, and 4), through contact 197 (now closed), over conductor 204, to battery 205 (Fig. 4). Contact 202 is controlled by a cam exemplified by cam contour 150, Fig. 11. Magnet 201, upon operating, releases a clutch (not shown) in well known manner to initiate the rotation of a cam shaft (not shown) in the distributor 126, the cams on which are exemplified by the cam diagram shown in Fig. 11. Promptly upon initiation of rotation of the cam shaft, the contact 137 closes to complete a locking circuit for relay 133 from grounded battery 138 (Fig. 4), through contact 137 (now closed), over conductor 136 (Figs. 2, 3, and 4), through contact 195 (still closed) and through the winding of relay 133 to ground. As observed from Fig. 11, the contact 137, controlled by the locking cam 140, remains closed (and the relay 133 remains energized) until the fifth impulse of the code has been transmitted. That is, contact 137 will stay closed to furnish a locking path for relay 133 throughout the transmission period, assuring the transmission of all five impulses. Transmission is effected over a circuit comprising one side 206 of the signal line (Fig. 4), over bus conductor 207 (Figs. 2, 3, and 4), through contacts 198 (now closed) of relay 133, over the bus conductors 208, through the contacts 139 as they are closed sequentially by the transmitting cams, then over side 209 of the line. The opening of contact 172 of relay 133 breaks the locking circuit for relay 142, which releases.

The closing of contact 196 of relay 133 effects the energization of conditioning relay 141 at an instant determined by the closure of a timing contact 211 controlled by the shift relay cam, exemplified by contour line 180 in Fig. 11. This circuit is established from grounded battery 213 (Fig. 2), through the winding of relay 141, over conductor 214, through contact 196 (still closed) of relay 133, over conductor 215 (Figs. 2, 3 and 4) and through contact 211 (when closed), to ground. Relay 141, when energized closes its contacts 216, 217 and 218. Upon the closing of contact 216, a locking circuit for relay 141 is provided from battery 213, through the winding of relay 141, then through the contact 216 (now closed), and through the contact 219 (now closed) of "figures" relay 135, to ground.

Upon the closing of contact 218 (of relay 141) a shunt is provided around relay 133 to permit the aforementioned "A" code relay 194 to energize. Relay 194 upon operating closes its locking contact 221, distributor clutch control contact 222, and code control contacts 223. The locking circuit for relay 194 is completed from ground (Fig. 2) through contact 218 (now closed) of relay 141, over conductor 132, through the winding of relay 194, through locking contact 221 (now closed), over conductor 136 (Figs. 3 and 4) and through cam controlled contact 137 to battery 138. Upon the closing of the distributor clutch contact 222 a circuit is again completed for the distributor clutch magnet 201 (at the conclusion of the previous cycle just described for transmitting the "letters" or unshift code signal) from ground, through contact 202 (now closed), through the winding of magnet 201, over conductor 203 (Figs. 4 and 3), through contact 222 (now closed) of relay 194, and over conductor 204 to battery 205. During the ensuing rotation of the distributor cam shaft and the sequential closing of contacts 139 the signal impulses identified with the alphabetical character A will be transmitted over the line 206—209 in the same manner as previously described for the "letters" or unshift code.

It is observed that the "letters" or unshift code signal preceded the alphabetical character automatically. Should the next character sensed on the card also be an alphabetical character it will not be preceded by a "letters" or unshift code signal. However, if the case should change, that is if the next character sensed is a "figures" or upper case character, then according to the present invention said character will be preceded automatically by a "figures" shift code signal, the actual transmission of the character sensed being deferred until the "figures" or case code signal has been transmitted. Thus, a feature of the invention resides in automatically inserting a case signal upon each change of case.

It will be assumed now that the card code for a numeral, or upper case of "figures" shift character, is next sensed in the card, for example, the numeral 1. Over a circuit to be described the Baudot code relay 224 (Fig. 3) will become energized. In response to the sensing of the code holes in the card, the card code relay 112 will become energized by current derived from battery 103. During the rotation of the distributor cam shaft the contact 125 will close to complete a circuit for relay 224, through the fan circuit shown in Fig. 1, from battery 124 (Fig. 4), through contact 125, over conductor 127, through contact 186 (still closed) of relay 111, through contact 187 (now closed) of relay 112, through contact 188 of relay 113, through contact 225 of relay 114, contact 226 of relay 115 and contact 227 of relay 116, then over conductor 228 (through cables 128, 129 and 130) through the winding of relay 224 (Fig. 3), over conductor 134, and through the winding of relay 135 (Fig. 2) to ground. As previously described, this circuit will allow relay 135 to operate, but the winding of the transmitting relay 224 (which is one of the transmitting relays 131) is so designed that it will not operate when in series with the "figures" relay 135.

As previously described in connection with the transmission of an alphabetical character, a "figures" or shift signal will be transmitted before the upper case character signal will be transmitted. That is, the shift signal will be inserted or introduced automatically. Accordingly, the relay 135 will close its contacts 229, 231, 232 and code contacts 233, and open its contacts 219 and 234. The contact 229 upon closing completes an energizing circuit for the distributor clutch magnet 201 (Fig. 4) over the circuit previously described for contact 197, with which contact 229 is connected in parallel. As previously mentioned, the magnet 201 controls a cam shaft for operating the contacts 125, 137, 184, 202, 211, and 235. As before, the closing of contact 137 completes a locking circuit for relay 135 (the same as it did for relay 133), and transmission of the "figures" shift code over the signal line 206—209 will be effected.

The closing of cam controlled contact 211 (Fig. 4), controlled by cam 180, Fig. 11, completes an operating circuit for the conditioning relay 142 (Fig. 2) from grounded battery 168, through the winding of relay 142, over conductor 167 to junction 236, over conductor 237, through contact 232 (now closed), then over conductor 215 (Figs. 2, 3 and 4) and through the closed contact 211 to ground. Relay 142, as before, becomes locked up through its own contact 169 and contact 172 (now closed) of relay 133. Besides closing its contacts 169 and 178, relay 142 also closes its contact 238 to provide a shunt around the relay 135, thereby permitting the relay 224 to operate and close its contacts 239, 241 and 242. Upon the closing of locking contact 242, a locking and operating circuit for relaly 224 is completed from grounded battery, through cam controlled contact 137 (Fig. 4), over conductor 136, through contact 242 (now closed) of relay 224 (Fig. 3), through the winding of relay 224, over conductor 134 to junction 243 (Fig. 2), over conductor 244 and through contact 238 (now closed) of relay 142, to ground. Upon the closing of the distributor clutch contact 239 a circuit is again completed for the distributor clutch magnet 201 (upon the completion of the previous cycle just described for transmitting the "figures" or unshift code signal) from ground, through contact 202 (Fig. 4) as previously described. During this rotation of the distributor the code signal impulses for the numeral "1" will be transmitted.

Figure 7:
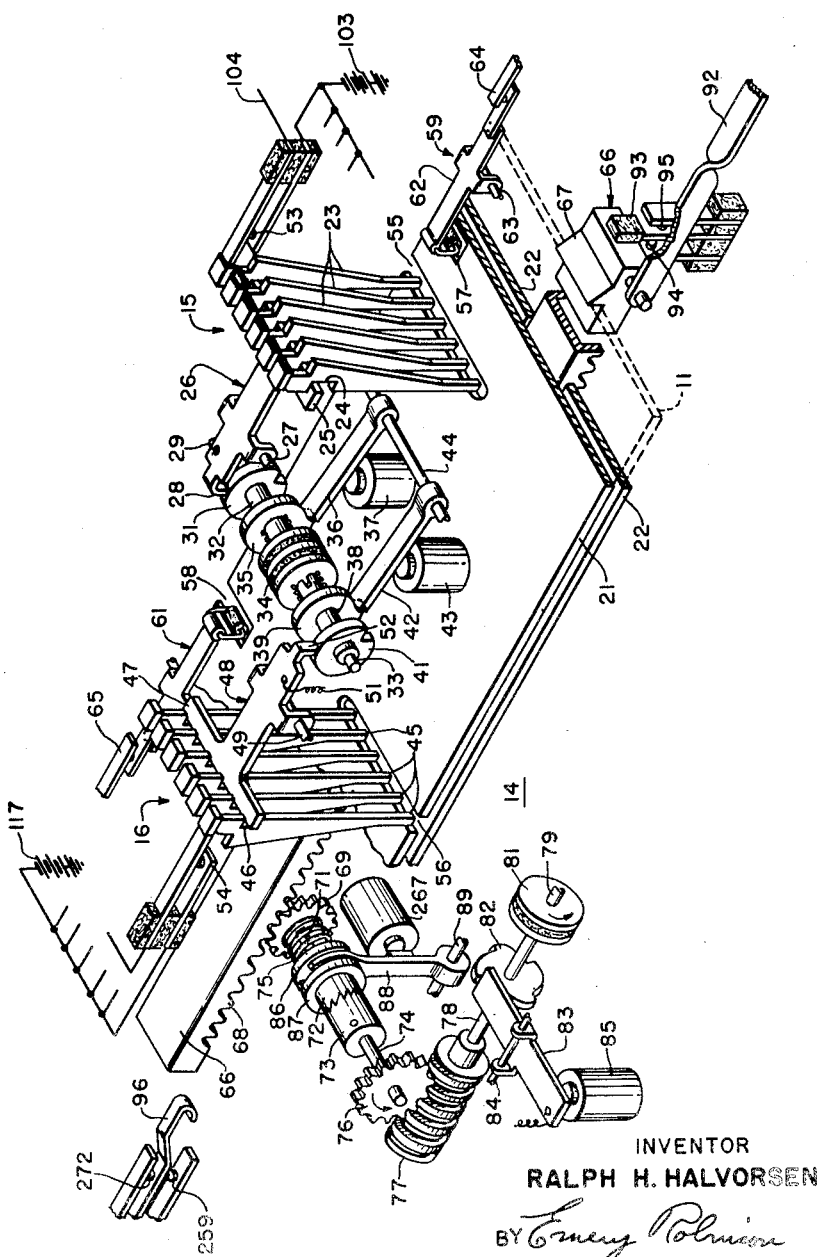
Fig. 7 is a perspective view of the card sensing device according to the present invention.

The card stepping mechanism shown in Fig. 7 has been previously described. The means for controlling the stepping operation will not be set forth. The cam controlled contact 235 in the distributor 126 (Fig. 4) is associated with the card stepping function (exemplified by cam contour 190, Fig. 11), and when it is closed (as indicated in the cam diagram in Fig. 11) a circuit for the pulsing or momentary energization of the stepping magnet 85 (Figs. 2 and 7) is completed from ground, through contact 235 (now closed momentarily by its cam 190), through normally closed contact 245 of relay 182 (Fig. 4), over conductor 234, through contacts 199 and 237 (now closed) of relays 133 and 135, respectively (Fig. 2), over conductor 247, and through the winding of relay 248 (Fig. 4) to grounded battery. Relay 248 upon energizing closes it contacts 249 and 251. The closing of contact 249 provides a locking circuit for relay 248 for a purpose to be hereinafter described. However, under the present condition of operation, the relay 248 is operated only momentarily; that is, for the duration of closure of contact 236 (Fig. 4) by the card stepping cam, and upon the closing of contact 251, a circuit is established for the stepping magnet 85 (Fig. 2) from battery 166, over conductor 165, through the winding of magnet 85, over the conductor 252 (Figs. 2, 3 and 4) and through the contact 251 to ground.

The cams on the cam shaft in the distributor 126 are so arranged that the contact 202 will open to release the clutch magnet 201, and the contact 125 will open so that the operated transmitting relay 131 will be under control of its locking path. Thus, an overlap is provided between the sensing and transmitting functions to allow sensing of the next column to take place while the previous column information is being transmitted.

Card stepping will take place cyclically column by column except when there is a change between upper and lower case (shift and unshift) or vice versa, in which event, as previously noted, either the unshift ("letters") relay 133 or the shift ("figures") relay 135 will be energized to open its respective contact 199 or 234, thereby breaking the operating circuit for the feed control relay 248. In this manner, the card stepping operation is suppressed to enable first the transmission of a case signal ("letters") and then the transmission of the character sensed in the card. Thus, upon a change of case the code perforated in the card is sensed or read twice, the first reading determines the case. If the case remains the same, the stepping or feeding function proceeds uninterruptedly, and if the case changes, then the feeding operation is suppressed for one cycle to permit the transmission of the proper case signal.

Figure 2:
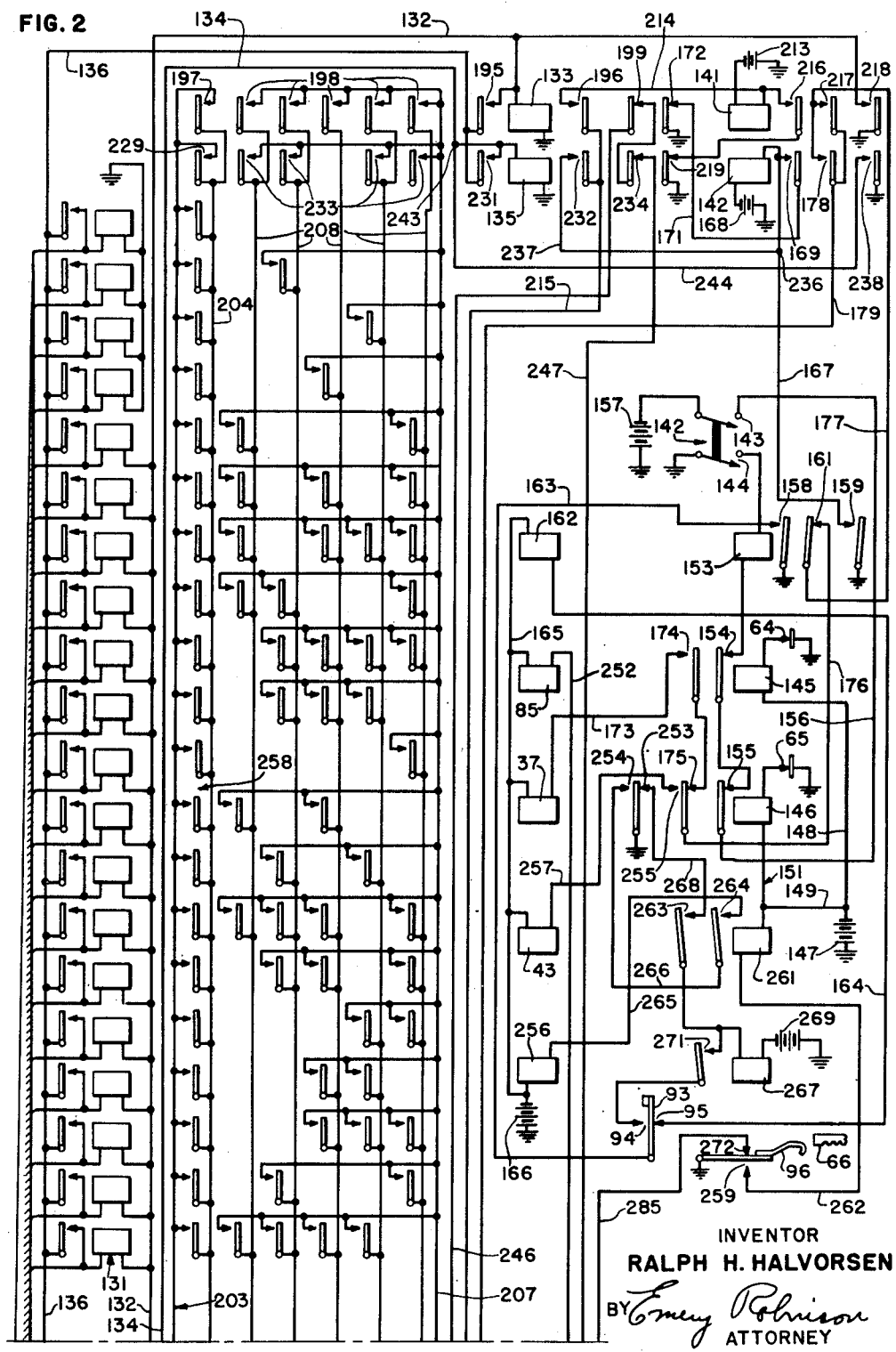

The above-described procedure of sensing or reading the upper field of the card 11 will continue until the card has progressed the 45 columns of the upper field, it being recalled that the length of the card 11 (Fig. 10) is divided into, for example, 45 columns, so that the upper field 12 and lower field 13 total 90 columns. Of course, any number of columns can be adopted. The upper field contact 64 and lower field contact 65 (Fig. 7) are so located that as the card 11 moves from the forty-fifth to the forty-sixth columns (that is, from the right-hand column of the upper field to the left-hand column of the lower field), the lower field card contacts 65 (Fig. 2) will open and the upper field card contacts will close. This will cause the lower field relay 146 to deenergize, and the upper field relay 145 to operate. Relay 145 upon energizing will open its contact 174 to break the circuit for the upper field sensing magnet 37 (Figs. 2 and 7). Thus, in the circuit of start relay 153, the contact 154 of relay 145 is closed, and contact 155 of relay 146 is now open.

Relay 146 upon releasing will open its contacts 155, 175 and 253, and close its contacts 254 and 255. The closing of contact 255 prepares a circuit (to be presently traced) for the lower field sensing magnet 43 (Figs. 2 and 7). The closing of contact 254 prepares a circuit (hereinafter traced) for the eject magnet 256. The energization of relay 145 and deenergization of relay 146, as just described, functions to transfer the sensing operation from magnet 37 to magnet 43. Hence, upon the closing of contact 255 a circuit for magnet 43 will be completed from battery 166, over conductor 165, through the winding of magnet 43, over conductor 257, through contact 255 (now closed) of relay 146, over conductor 176, through contact 161 (still closed) of relay 153, over conductor 177, through either contact 217 or 178 (one or the other of which is closed, depending upon whether the code sensed in the card is in the upper or lower case), over conductor 179 (Figs. 2, 3, and 4), through contact 181 of relay 182, over conductor 183, through contacts 184 and 185 to ground.

The contacts 53 and 54 are connected in parallel and in turn control the card code relays 111 to 116, as previously mentioned. Thus, when the sensing operation proceeds in the lower field as it did in the upper field, the sensing of holes in the card 11 by the sensing fingers 45 acts to close the contacts 54 correspondingly.

It is now observed that the closed contact 202 normally prepares the circuit for the clutch magnet 201, which circuit becomes established upon the closure of any of the contacts (indicated generally as 258) of relays 131, and analogous relays. Thus, when the card code is sensed in the lower field (as in the upper field) the contacts 54 are closed permutably to complete circuits for the energization of corresponding ones of the card code relays 111 to 116. A path is then completed through the fan circuit (Fig. 1) so that current from battery 124, through contact 125 (Fig. 4) is extended over conductor 127, and through the fan circuit path to the selected transmitting relay 131. As previously described, this circuit extends over conductors 132 or 134 through the windings of relays 133 and 135, unless these relays are shunted by the closure of contacts 218 or 238, in which event relays 133 and 135 will not operate. It is recalled that relays 133 and 135 operate only upon a change of case (or shift condition).

The system according to the invention will thus function as described until all the card columns (90 in the present embodiment) are sensed. While the information or code in column 90 is being transmitted and the card stepping cam is closing its contact 235, the card 11 will advance one step, and the stepping rack 66 will through contactor 96, close the eject contact 259 to complete a circuit for energizing the eject relay 261 (Fig. 2) from ground, through contact 259 (now closed), over conductor 262, through the winding of relay 261 and over conductor 149 to battery 147. Relay 261 upon energizing closes its contacts 263 and 264.

Contact 264 upon closing completes a circuit for energizing the card eject magnet 256 (Fig. 2) from battery 166 through the winding of relay 256, over conductor 265, through contact 264, over conductor 266, through contact 254 (now closed) of relay 146, to ground. The eject magnet will, for example, function to set in motion the card ejecting mechanism including the withdrawal of the stop 18, the ejection of the card being effected substantially as disclosed in the aforementioned Patent No. 2,044,707. As the card 11 is thus ejected from the card sensing device 14, the contact 65 will again close and the circuit for relay 146 (Fig. 2) will be completed, thereby effecting the energization of said relay 146 and the closing of contacts 155, 175 and 253. Relay 153 will also energize.

Contact 253 of relay 146 (Fig. 2) upon closing completes a circuit for a carriage return magnet 267 (Figs. 2 and 7) from ground, through contact 253 (Fig. 2), over conductor 268, through contact 263 (now closed) of relay 261, through the winding of magnet 267 to battery 269. The carriage return magnet 267 closes its locking contact 271 to complete a locking circuit from battery 269, through the winding of magnet 267, through contact 271 (now closed), through contact 94 (still closed), over conductor 163, and through contact 158 (still closed) of start relay 153, to ground. The carriage return magnet 267, upon energization will attract its armature 88 to effect the disengagement of clutch portion 72 from the clutch portion 73, thereby permitting the carriage return device (exemplified by strap 92) to actuate the rack 66 rightwardly (as viewed in Fig. 7) to its carriage return position whereat the contact 94 is opened, and the contact 95 is again closed. The opening of contact 94 breaks the locking circuit for the carriage return relay 267. As the rack 66 is returning to its normal position, the contact arm 96 is disengaged, and the contact 259 is opened and the contact 272 is again closed. The closing of contact 95 by the rack 66 upon the completion of the carriage return function will again complete an energizing circuit for the card feeding magnet 162 to effect the advancement of a new card into the card sensing device 14. With the new card in the card advancing device 14, the card controlled contact 64 for the upper field will again open, thus deenergizing the upper field relay 145. The sequence of reading or sensing a new card is initiated, and the operation is repeated.

As previously mentioned, provision is made in the present embodiment of the invention for the automatic insertion of telegraph signals, for such functions as trip, intermediate trip, skip, carriage return and line feed. It is recalled that a commutator arrangement, Fig. 8, is provided wherein a brush arm 98, carrying a plurality of brushes 90 traverses a corresponding plurality of commutator segments 101. Moreover, the segments 101 in the commutator rack are drilled at each step or column so that a copper peg (or of any conductive material) may be inserted at any location of the commutator. Assuming that a copper peg is inserted in column 45 of the "trip" commutator segment 101, and as the commutator brush arm 98 reaches and engages the peg in the commutator bar or segment 101, a circuit will be closed from ground, through the winding of relay 182 (Fig. 4), over conductor 273, over commutator brush arm 98, through contact 274 (exemplified by copper peg), through the winding of "trip" relay 275, to positive battery 276.

With the translating or code converting arrangement of the present invention functioning as hereinbefore described, a circuit for the "Fig. Z" card code relay 277 (which is the code representing the "trip" function in the card punch unit) is established from ground, through tape controlled contact 185 and cam controlled contact 186 (now closed) of distributor 126 (Fig. 4), over conductor 183, through contact 278 (now closed) of relay 182, over conductor 279, through contact 281 (now closed) of "trip" relay 275, over conductor 282, through the winding of relay 277, over conductor 134 (Figs. 2, 3 and 4) to junction 243, then through the winding of relay 135 to ground.

Upon the energization of relay 135, the "Figures" code or shift signal will be automatically transmitted, as described hereinbefore in connection with the feature covering the automatic insertion of a shift (or unshift) code signal, after which the upper case character "Z" (in the present instance) will be transmitted, the transmitting circuit being completed through the contacts 283 (now closed) of relay 277, and of course, the transmitting contacts 139.

During its operation, the "trip" relay 275 became locked up over a circuit extending from positive battery 276, through the winding of relay 275, through the locking contact 284 (now closed) of relay 275, over conductor 285 (Figs. 2, 3, and 4), through contact 272 (now closed) of the eject contact device exemplified by contact arm 96, to ground. At the close of the transmitting cycle for the character "Figs. Z," a circuit will be completed from ground, through the cam controlled contact 235 of distributor 126 (Fig. 4) over conductor 286, through contact 287 (now closed) of relay 182, over conductor 288, through contact 289 (still closed) of relay 277, over conductor 246, through closed contacts 199 and 237 (of relays 133 and 135, respectively), over conductor 247, and through the winding of stepping relay 248 to battery 291. Relay 248 (Fig. 4) will become locked up over a circuit extending from battery 291, through contact 249 (now closed), over conductor 292, through contact 293 (now closed) of relay 275, over conductor 294, to ground. Contact 251 (of relay 248) upon closing, completes a circuit for energizing the stepping magnet 85 (Fig. 2), which circuit extends from battery 166 (Fig. 2), over conductor 165, through the winding of magnet 85, over conductor 252 (Figs. 2, 3 and 4), through contact 251, to ground.

The trip relay 275 (Fig. 4) being locked under the control of the card eject contact 272 (Fig. 2) will remain operated until the card stepping rack 66 reaches the card eject contact arm 96, whereupon the contact 272 will open and the contact 259 will close. As contact 272 opens, the trip relay 275 will become de-energized, thereby releasing the stepping relay 248, and hence the stepping magnet 85. As described hereinbefore, contact 259 upon closing will complete a circuit for operating the card eject relay 261, whereupon circuits are completed for the eject magnet 256 and the carriage return magnet 267. As the card leaves the stepping rack 66, the lower field relay 146 is operated to complete a circuit for the operation of the carriage return magnet 267, thereby returning the rack 66 to its starting position.

Other functions such as intermediate trip, skip, carriage return and line feed may be accomplished in substantially the same manner as the trip function just described. According to the present embodiment of the invention a copper peg inserted in the "skip" commutator bar 101 will effect the transmission of the "Fig. G" code signals. For "carriage return" the "Fig. A" code signals will be transmitted. For "intermediate trip" either "Fig. M," "Fig. CR" or "Lett. CR" will be transmitted depending on which commutator bar 101 the copper peg is inserted.

Figure 3:
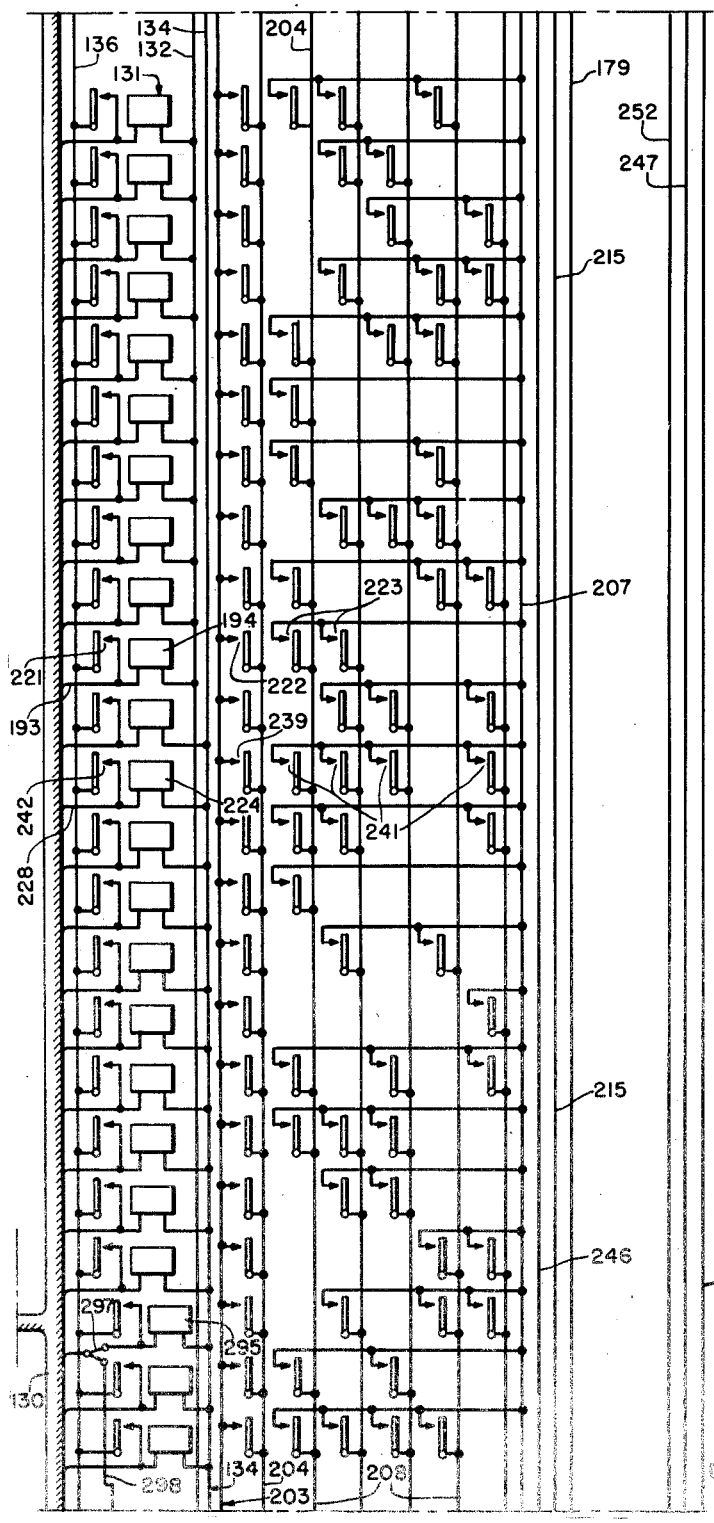
Figure 4:
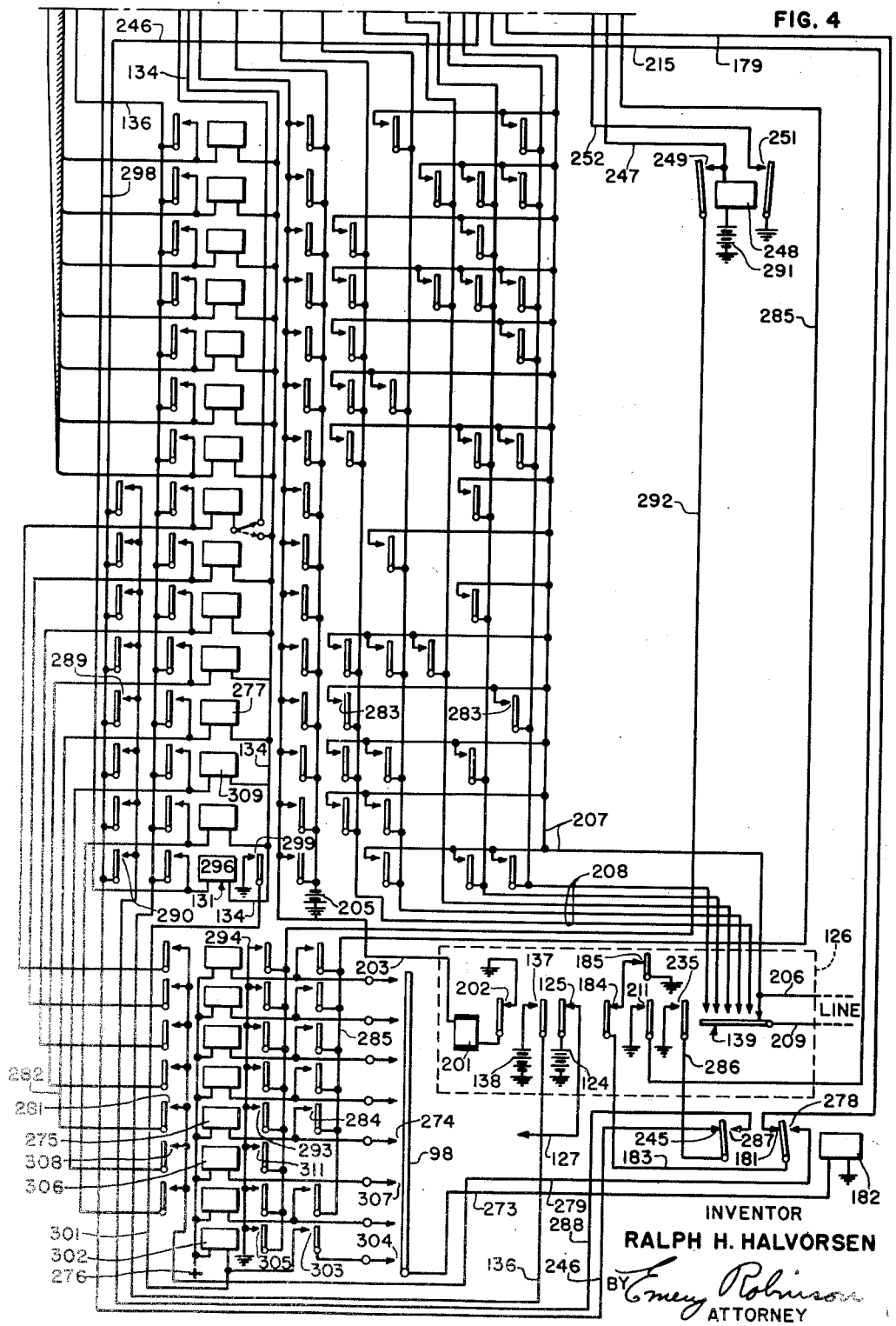

When the "horizontal tabulation" code O-1-7 is sensed in the card 11 a circuit is established in the usual manner from contact 125 in the distributor 126 (Fig. 4) through the fan circuit, (Fig. 1) to the HT relay 295 (Fig. 3), or to the G-1 relay 296 (Fig. 4) depending on the setting of switch 297 (Fig. 3). If the switch 297 is set to permit the energization of relay 295 a signal for upper case "G" is transmitted in the manner described hereinbefore, in which event the stepping function will be limited to one column or step. However, if the switch 297 is rotated to connect with the conductor 298, a circuit is established for the energization of relay 296, extending over conductor 298 (Figs. 3 and 4), through the winding of relay 296, over conductor 134, through the winding of relay 135, to ground. The operation of relay 296 will start transmission of the upper case G character in the manner already described in connection with upper case characters, for example, the numeral "1".

In addition, a circuit will be established from ground, through contact 299 (now closed) of relay 296 (Fig. 4), over conductor 301, through the winding of relay 302 to positive battery. Relay 302 will lock over its commutator 101, through its commutator brush 90, provided that copper pegs are inserted in the "Skip 1" commutator bar at the particular column being sensed at the time the G-1 relay 296 operates. This locking circuit extends from positive battery, through the winding of relay 302, through locking contact 303 (now closed) of relay 302, then through commutator 304, over conductor 273, and through the relay 182 to ground. As the distributor shaft rotates, the cam controlled contacts 235 (Fig. 4) will close to complete a circuit for the operation of the stepping relay 248, extending from ground, through contact 235 (now closed for a predetermined period) Fig. 4, then through contact 287 (now closed) of relay 182, over conductor 288, through contact 290 (now closed) of relay 296, over conductor 246 (Figs. 2, 3, and 4), through contacts 199 and 237 (now closed), over conductor 247, and through the winding of relay 248 (Fig. 4) to battery 291. With the stepping relay 248 operated, the stepping clutch magnet 85 will be energized, thereby moving the stepping rack as previously described. The stepping relay 248 was locked up over conductor 292 and through contact 305 of relay 302 to ground.

As mentioned before, the relay 302 is locked up through the commutator contact 304. Thus, it may be concluded that the relay 302 will remain operated for as many columns as there are pegs inserted in the "Skip 1" commutator bar 101. Accordingly, by this method the stepping rack 66 can be continuously advanced any number of columns. When the respective commutator brush 99 leaves the last peg, the skip relay 302 will release, owing to the opening of its contact 304, causing the stepping rack 66 to stop thereat, and operation of the card sensing device will proceed in the manner previously described.

By the insertion of copper pegs in the "Skip" commutator bar 101 the "Skip" relay 306 (Fig. 4) will operate through commutator contact 307. The operation of the "skip" relay 306 will complete, through its contact 308, a circuit to operate the "G" transmitting relay 309 (Fig. 4) which will transmit upper case "G" in the manner described. When the stepping relay 248 operates in this cycle it will lock up through the contact 311 of the Skip relay 306, and consequently relay 248 will remain operated as long as the Skip relay 306 is operated, which again will depend on the copper pegs inserted in the "Skip" commutator bar 101.

In Figs. 12, 13 and 14 is disclosed an alternate form of sensing unit wherein the sensing or card reading elements comprise contact devices of the ball type, and a continuous chain type stepping device. Referring to Fig. 12, the card sensing device comprises an upper plate 412 and a lower plate 413 suitably spaced to permit the passage therebetween of a statistical card 11. Similar to the arrangement disclosed in Fig. 7, card supply and card feeding facilities are provided, although not shown. Also, card ejecting and card receiving facilities are contemplated. In Fig. 13 is shown a detail view of the card sensing contact elements which comprise a rigid contact portion 414 and a flexible or resilient contact portion 415 insulatably mounted on the top plate 412. The free end of the upper or flexible portion 415 of the contact device is provided with a portion 416 of insulating material adapted to rest upon a ball 417 loosely inserted in a hole 418 in the top plate 412. With no card 11 inserted between the plates 412 and 413, the ball 417 will be pressed between the portion 416 and the bottom plate 413, and the contact 418 will be closed. When a card 11 is interposed between the ball 417 and the bottom plate 413 the insulating portion 416 will be raised and the contact 418 will be opened. Furthermore, when the card 11 is stepped along columnwise and a code hole 419 in the card is presented beneath the ball 417, the contact 418 will close.

Referring again to Fig. 12, a group of contacts 418 comprise an upper field sensing or reading means 421 and a similar group of contacts 418 comprise a lower field sensing means 422. Also, appropriately positioned on the card sensing device is an upper field contact device 423 and a lower field contact device 424 analogous to contact devices 59 and 61, respectively. The bottom plate 413 is provided with a longitudinal slot 425 into which and along which operates card moving elements 426 carried by a sprocket chain 427 comprising the card feeding device. The chain 427 is driven by a sprocket wheel 428. Power is imparted to the chain 427 by a drive means similar to that shown in Fig. 7 comprising the stepping magnet 85. However, since the feeding action of chain 427 is continuous, no carriage return mechanism is necessary, and hence the clutch 72—73 and carriage return magnet 267 can be dispensed with.

Comparing the circuit in Fig. 14 with the circuit in Fig. 9, the upper field sensing magnet 37, the lower field sensing magnet 43 and carriage return relay 267 have been eliminated. The contact arrangements 93—94—95 and 96—259 have been dispensed with. The contact arrangements for upper field relay 145 and lower field relay 146 have been changed. Upon closure of switch 142 a circuit for energizing the start relay 153 is completed from ground, through closed contact 144, through the winding of start relay 153, through contact 429 (now closed) of relay 145, over conductor 431, through contact 432 (now closed) of relay 146, through closed contact 143 of start switch 142 to battery 157. Relay 153 upon energizing will close its contacts 159 and 433 and open its contact 434. The effect of closing contact 159 is the same as heretofore described. Contact 434 when closed prepares a circuit for the stepping magnet 85, which circuit will be completed as hereinbefore described from the stepping relay 248 (Fig. 4) over conductor 252, through contact 434, over conductor 435, through the winding of stepping magnet 85, over conductor 165 to battery 166, when a stepping operation is to be performed.

Contact 433, upon closing, completes a circuit for operating the card feeding magnet 162 from ground, through contact 433, over conductor 436, through the winding of card feed magnet 162, over conductor 165 to battery 166. The card 11 upon being fed into the card sensing device (Fig. 14) will open the contact 64 (through the ball type contact device 423) and thus open the obvious circuit for the upper field relay 145. Relay 145 upon releasing will open its contact 429 and close its contacts 437. Thus, circuits will be completed from the upper field sensing contacts 421, through contacts 437, over conductors 438 and 439 to the card code relays 111 to 116. A circuit is thus completed through the fan circuit (Fig. 1) to the Baudot code relays 131 to effect transmission of a Baudot code signal as hereinbefore described, a stepping function being initiated during each transmission.

After a card 11 has been stepped 45 columns (in the present embodiment) and sensing or reading of the upper field is completed, the card 11 passes beyond the ball contact devices 421, and upon stepping to the 46th column the ball contact devices 422 are engaged. Substantially simultaneously the ball contact device 424 is engaged to open the lower field contact 65 to break the circuit for lower field relay 146. Relay 146, when released, will open its contact 432 and close its contacts 441. The timing of operation of contacts 429 and 432 should be such that the contacts 432 are opened before contacts 429 are closed, to maintain the start relay 153 unenergized during the sensing or reading operation. With the closing of contacts 441, circuits will be completed from the lower field sensing contacts 422, through contacts 441, over conductors 439 to the card code relays 111 to 116 thereby complete a circuit through the fan circuit (Fig. 1) to the selected Baudot code transmitting relay 131. The stepping magnet 85 is operated cyclically during the sensing of the lower field until the last column (90th) is sensed (or read) whereupon contact 65 is again closed to effect the energization of lower field relay 146, thereby permitting contacts 432 and 429 to be closed simultaneously to energize the start relay 153. When the start relay 153 is thus energized, its contact 433 will close to complete a circuit for the card eject relay 256 from ground, through contact 433 (now closed), over conductor 436, through the winding of card eject magnet 256 to battery 166. Simultaneously, however, the card feed magnet 162 will be operated, so that a new card will be fed into the card sensing device at the same time that one is ejected. An overlap is thus provided resulting in a substantial saving of time. A further saving of time is achieved by the elimination of the carriage return function.

While the present invention has been illustrated and described with reference to specific structures, it will be understood that various other modifications may be made without departing from the spirit of the present invention. Hence, all forms coming within the scope of equivalency of the appended claims are intended to be covered by the invention.

What is claimed is:

1. An arrangement for converting information punched in upper case or lower case in two fields in a tabulating card in one code to another code for transmission telegraphically, comprising means for advancing said card column by column, means for sensing one field, means for sensing the other field, electrical circuit means including card controlled contact means for effecting said sensing operations sequentially, a fan circuit in said electrical circuit means, means under the control of the codes punched in said card for establishing a circuit through said fan circuit, relay means governed by said fan circuit for establishing a condition, whereby the card code is converted to said other code, means for transmitting a signal according to said other code, means for automatically inserting an appropriate shift code signal upon each change of case, and means for suppressing the operation of said card advancing means during the period of operation of said signal inserting means.

2. In combination a device for reading the coded record on a statistical card, said card having an upper field and a lower field, a first sensing device for reading the upper field, a second sensing device for reading the lower field, cyclically operable means for stepping said card from an initial position to a final position, electrical circuit means including card controlled contact means for effecting the operations of said sensing devices sequentially, said electrical circuit means comprising a fan circuit and connected relay means for converting, through said fan circuit, the code read in the card into a different code signal governed by the relays, each of said codes having different case groups, means in said electrical circuit means for automatically inserting an appropriate shift code signal upon each change of case, and means to suppress the operation of said cylically operable means during the period of operation of said signal inserting means.

3. In a device for reading the coded record on a statistical card, said card having an upper field and a lower field, a first sensing device for reading the upper field, a second sensing device for reading the lower field, cyclically operable means for stepping said card from an initial position to a final position, means cooperable with said cyclically operable means for effecting the operation of said sensing devices sequentially, and automatic means effective when said cyclically operable means has reached its final position for returning said cyclically operable means to its initial position.

4. In a device for reading the coded record on a statistical card, said card having an upper field and a lower field, a first sensing device comprising self-closing ball-controlled contact means for reading the upper field, a second sensing device comprising self-closing ball-controlled contact means for reading the lower field, cyclically operable means for stepping said card through said first and second contact means sequentially from an initial position to a final position, and automatic means effective when said cyclically operable means has reached its final position for returning said cyclically operable means to its initial position.

5. In a device for reading the coded record in a statistical card, said card having an upper field and a lower field, a first sensing device for reading the upper field, a second sensing device for reading the lower field, electrical circuit means including card controlled contact means for effecting the operations of said sensing devices sequentially, said electrical circuit means comprising a fan circuit and connected relay means for converting, through said fan circuit, the code read in the card into a different code signal governed by said relays, means comprising a commutator and relay means independent of said fan circuit for automatically inserting predetermined function code signals, and means for suppressing the operation of said sensing devices during the insertion of said function code signals.

6. In combination with a device for reading the record in one code on a statistical card, said card having an upper field and a lower field, a first sensing device for reading the upper field, a second sensing device for reading the lower field, electrical circuit means for translating the record read from said one code to a different code, means for transmitting said record in said different code, cyclically operable means controlled by said transmitting means for stepping said card column by column, card controlled contact means operably associated with said electrical circuit means and cooperable with said cyclically operable means for effecting the operations of said sensing devices sequentially, commutator means operably associated with said cyclically operable means for automatically inserting predetermined function signals, and means for suppressing the operation of said sensing devices during the insertion of said function code signals.

7. In combination in a device for reading the record in one code on a statistical card, said card having an upper field and a lower field, a first sensing device for reading the upper field, a second sensing device for reading the lower field, electrical circuit means for translating the record read from said one code to a different code, means for transmitting said record in said different code, cyclically operable means controlled by said transmitting means for stepping said card column by column, card controlled contact means operably associated with said electrical circuit means and cooperable with said cyclically operable means for effecting the operations of said sensing devices sequentially, commutator means associated with said cyclically operable means, elements removably insertable in said commutator, and relay means in said electrical circuit means for controlling the operation of said cyclically operable means according to the positionment of said elements in said commutator.

8. In a device for reading the coded record on a statistical card, said card having an upper field and a lower field, a first sensing device for reading the upper field, a second sensing device for reading the lower field, cyclically operable means for stepping said card from an initial position to a final position, means cooperable with said cyclically operable means for effecting the operation of said sensing devices sequentially, commutator means comprising a contact arm operably associated with said cyclically operated means adapted to cooperate with a set of predeterminedly pegged contact devices, whereby predetermined function code signals are automatically inserted, and automatic means effective when said cyclically operable means has reached its final position for returning said cyclically operable means to its initial position.

RALPH H. HALVORSEN.

REFERENCES CITED

The following references are of record in the file of this patent:

UNITED STATES PATENTS

| Number | Name | Date |
|---|---|---|
| 1,419,256 | Hammond | June 13, 1922 |
| 1,462,875 | Stoddard | July 24, 1933 |
| 2,343,405 | Doty | Mar. 7, 1944 |